Sept. 9, 1941.  MacMILLAN CLEMENTS  2,255,151
METHOD AND PRODUCT OF JOINING MATERIAL
Filed May 26, 1939
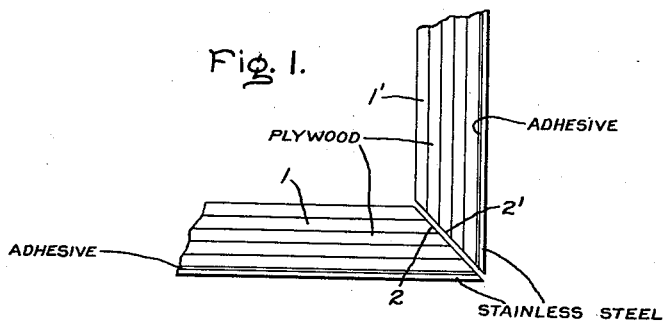
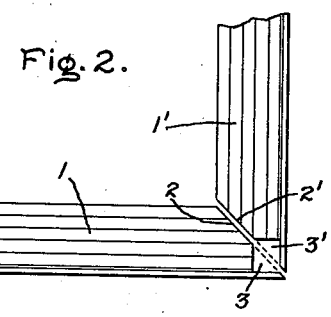
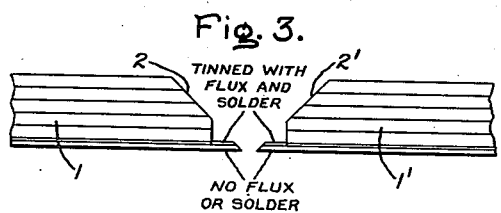
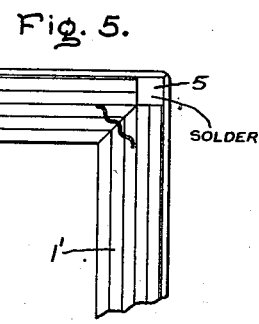
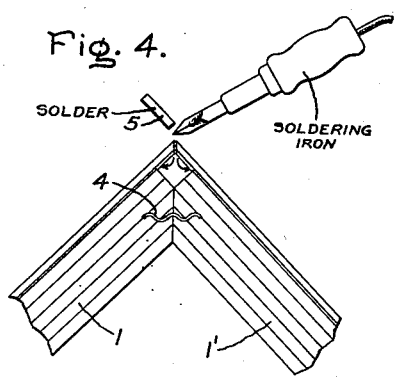
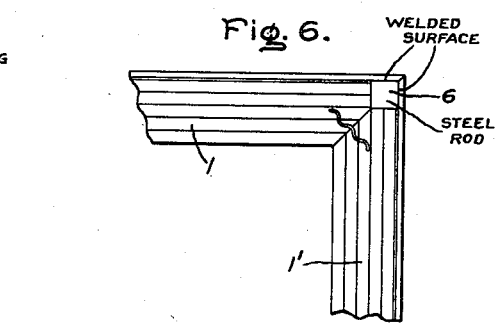
Inventor:
MacMillan Clements,
by Gilbert P. Tarleton
His Attorney.

Patented Sept. 9, 1941

2,255,151

UNITED STATES PATENT OFFICE 2,255,151

METHOD AND PRODUCT OF JOINING MATERIAL

MacMillan Clements, Schenectady, N. Y.

Application May 26, 1939, Serial No. 275,824

9 Claims. (Cl. 113—112)

This invention relates to a method and product of joining material and more particularly to a new and improved method and product of joining the adjacent edges of the flanged panel which is constructed in accordance with my Patent No. 2,149,882.

That patent is directed to a method of stiffening and rendering warp-free material consisting of a thin layer of metal adhesively secured to a relatively thick backing layer of wood or similar relatively light-weight and relatively inexpensive material. The metal may be of a variety of compositions, a preferred composition being 26-gauge stainless steel, and the backing may be made of plywood. Such material when fabricated in the manner set forth in my patent has substantially the strength, rigidity, long-wearing qualities, and appearance of metal, while at the same time it has the lightness, relatively low cost and ease of workability of wood. I have found that it is particularly well adapted for use as a table top, a counter top, a sink lining and various other similar uses.

However, one difficulty that I have encountered in practicing the invention of my patent is that it has been difficult properly to join the adjacent edges of the flanges without resorting to costly and unsightly brackets or braces mounted on the outer surface. Simple soldering of the metal edges does not produce a strong joint unless an excessive amount of unsightly solder on the outside surface is used. Direct welding of the metal edges is also unsatisfactory due to the thinness of the metal. When it is tried directly to weld the edges the metal seems to melt or burn away from the edge and a good weld cannot be secured. Wood fastening means, such as corrugated fasteners, do not produce an adequately strong joint and do not produce a water-tight joint and are therefore unsatisfactory.

In accordance with the present invention I solve this problem by cutting away portions of the wood backing of each of the pieces to be joined adjacent the joint and adjacent the outer metal surface. These pieces are cut away in such a manner that a substantially closed channel is formed along the edge to be joined, this channel having two sides of metal and two sides of backing material. This channel is then filled with metal which is bonded to the adjacent metal sides of the channel along the length thereof by suitable means such as soldering or welding. In this manner a smooth, strong, water-tight joint is formed without injuring or disfiguring the material.

An object of the invention is to provide a new and improved method and product of joining the edges of sheet or board-like material.

Another object of the invention is to provide a novel and simple method of securely fastening together in a water-tight manner the edges of the flanged panel constructed in accordance with my Patent No. 2,149,882.

The invention will be better understood from the following description taken in connection with the accompanying drawing and its scope will be pointed out in the appended claims.

In the drawing Fig. 1 illustrates in cross section two pieces of composite material which are to be joined along their adjacent edges, Fig. 2 illustrates the step of cutting out a portion of the backing material of each piece so as to form in each piece a metal and a backing side for the channel which is formed when the edges are placed in the relative positions they occupy when they are joined, Fig. 3 illustrates the third step in practicing my invention when the joint is to be soldered, Fig. 4 illustrates the method of soldering, Fig. 5 illustrates the completed soldered joint and Fig. 6 illustrates a welded joint.

Referring now to the drawing, and more particularly to Fig. 1, there are shown therein in cross section two pieces 1 and 1' of the composite material whose edges are to be joined. In the particular example illustrated the edges are to be joined at a 90-degree angle and consequently each edge is beveled at 2 and 2'. In Fig. 2 triangularly cross sectioned strips 3 and 3' are cut out of the beveled edges 2 and 2' so that when the pieces are placed in the proper positions for joining a substantially closed channel is formed having two adjacent sides of metal and two adjacent sides of backing material.

The next step consists of tinning with soldering flux and solder the inner surfaces of the two metal sides of the channel. The outer surfaces of these sides are not tinned. This step is illustrated in Fig. 3. The two pieces to be joined are then held in the proper relative position by any suitable means, such as by a corrugated wood fastener 4, and melted solder 5 is applied along the edge or seam of the adjacent metal edges. By reason of the tinning of the inner surfaces of the metal the solder is in effect drawn into the channel, as shown in Fig. 4, and does not adhere to the untinned outer surface of the metal. Actually, of course, it is the force of gravity which causes the solder to enter the channel. A suitable solder for this purpose consists of 95% tin and 5% antimony. This solder will not tarnish and has a tensile strength of approximately 6000 pounds per square inch. The supply of solder is continued until the channel is substantially filled with solder. The relatively sharp metal edge may then be rounded off, as shown in Fig. 5, if desired.

The solid solder filling of the channel which firmly bonds together the two adjacent metal sides of the channel forms a strong invisible water-tight joint.

Instead of soldering the joint I have also found that if the channel is filled with a steel rod 6 the metal sides of the channel can readily be welded to this rod, thereby forming a strong water-tight and invisible welded joint. This is shown in Fig. 6. When welding is used the step of tinning the inner surfaces of the metal sides of the channel is of course unnecessary and is even undesirable as the presence of the solder prevents the formation of a good weld.

It is to be noted that the weld is not between the abutting edges of the metal sides of the channel but is between the rod 6 and these sides. The rod is much thicker than the metal sides of the channel and it consequently has a much higher heat storage capacity than these metal sides. This prevents the temperature of the abutting edges of the metal sides from rising high enough to burn them away and it also prevents burning of the wood-backing during the welding operation, which operation may be a conventional spot-welding operation.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. The method of joining the edges of two pieces of composite material of the type consisting of a sheet of metal that is so thin that its edges burn away when it is attempted to butt weld them bonded by suitable adhesive means to a relatively thick backing sheet of wood comprising, removing such a portion of the backing adjacent the metal side of each edge to be joined that when said edges are placed in contact in the relative positions they are to occupy when joined a substantially closed channel will be formed having two adjacent metal sides and at least one side of backing material, placing said edges in contact so as to form said channel, and filling said channel with metal which is bonded to the metal sides of said channel at temperatures low enough to prevent burning away of the thin metal edges and prevent thermal destruction of the wood backing.

2. The method of joining at an angle the edges of two pieces of composite material of the type consisting of a sheet of stainless steel that is so thin that its edges burn away when it is attempted to butt weld them adhesively secured to a relatively thick backing sheet of plywood comprising, beveling the plywood edge of at least one of said pieces, removing such a portion of the plywood backing adjacent the metal side of each beveled edge to be joined that when said edges are placed in contact in the relative positions they are to occupy when joined a substantially closed channel will be formed having two adjacent metal sides and at least one plywood side, placing said edges in contact so as to form said channel, fastening the plywood backing edges together by suitable wood fastening means, and filling said channel with metal which is bonded to the metal sides of said channel at temperatures low enough to prevent burning away of the thin metal edges and prevent thermal destruction of the wood backing.

3. The method of joining the edges of two pieces of composite material of the type consisting of a relatively thin sheet of metal bonded by suitable adhesive means to a relatively thick backing sheet of wood comprising, removing such a portion of the backing adjacent the metal side of each edge to be joined that when said edges are placed in contact in the relative positions they are to occupy when joined a substantially closed channel will be formed having two adjacent metal sides and at least one side of backing material, tinning with soldering flux and solder the metal surfaces of said pieces which will form the inner metal sides of said channel, placing said edges in contact so as to form said channel, orienting said channel so that the metal-to-metal edge thereof is uppermost and substantially horizontal, placing molten solder along said metal-to-metal edge whereby the solder will run by gravity between said metal edges and will adhere to the tinned inner surfaces adjacent said edges and will not adhere to the outer untinned metal surfaces, and continuing to supply molten solder to said edge until said channel is substantially filled with said solder whereby the inner metal sides of said channel are held together by the solder filling of said channel.

4. The method of joining the edges of two pieces of composite material of the type consisting of a sheet of metal that is so thin that its edges burn away when it is attempted to butt weld them bonded by suitable adhesive means to a relatively thick backing sheet of wood comprising, removing such a portion of the backing adjacent the metal side of each edge to be joined that when said edges are placed in contact in the relative positions they are to occupy when joined a substantially closed channel will be formed having two adjacent metal sides and at least one side of backing material, placing said edges in contact so as to form said channel, filling said channel with a steel rod whose thickness is substantially greater than the thickness of said sheet metal, and welding said steel rod to the inner surfaces of the metal sides of said channel whereby the thermal storage capacity of said rod prevents burning away of the adjacent edges of said thin metal sides and prevents thermal destruction of the wood backing.

5. The method of joining at a right angle the edges of two pieces of composite material each consisting of an outer sheet of stainless steel which is so thin that the edges thereof cannot be directly joined by welding because of the burning away of the metal adhesively secured to a relatively thick backing layer of plywood which is destroyed at ordinary welding temperatures, comprising, beveling at forty-five degrees the edges to be joined, removing similar strips of plywood from along the edges to be joined, said strips extending transversely from the beveled surface of the plywood to the stainless steel, placing the cut-away beveled edges against each other with said pieces of material at right angles whereby the cut-away portions formed by the removal of said strips combine to form a closed channel having two metal sides and two wood sides, and filling said channel with metal which is bonded to the metal sides of said channel at temperatures low enough to prevent burning away of the thin metal edges and prevent thermal destruction of the wood backing.

6. A normally invisible water-tight angle joint between beveled edges of two pieces of material each of which is made of an outer sheet of metal which is so thin that its edges burn away when it is attempted to butt weld it bonded by suitable adhesive means to a relatively thick backing sheet of wood comprising, in combination, a channel running along the inner side of said joint, said channel being bounded on its outer sides by the portions of the inner surface of the metal sheets which are adjacent the joined edges thereof and being bounded on its other sides by said wood backing, and a metal filler for said channel which is thermally bonded to the metal sides thereof, said thermal bond being made at maximum temperatures which heat the main body of said metal filler below the point which will cause burning away the thin metal edges and thermal destruction of the wood backing.

7. A normally invisible water-tight angle joint between beveled edges of two pieces of material each of which is made of a relatively thin outer sheet of stainless steel whose thickness is such that its edges burn away when it is attempted to butt weld it bonded by suitable adhesive means to a relatively thick backing sheet of plywood comprising, in combination, corrugated wood fastening means for joining the adjacent edges of the plywood backing, a channel running along the inner side of said joint, said channel being bounded on its outer sides by the portions of the inner surface of the metal sheets which are adjacent the joined edges thereof and being bounded on its other sides by said wood backing, and a metal filler for said channel which is thermally bonded to the metal sides thereof, said thermal bond being made at maximum temperatures which heat the main body of said metal filler below the point which will cause burning away the thin metal edges and thermal destruction of the wood backing.

8. An invisible water-tight angle joint between beveled edges of two pieces of material each of which is made of a relatively thin outer sheet of metal which is so thin that its edges burn away when it is attempted to butt weld them bonded by suitable adhesive means to a relatively thick backing sheet of wood comprising, in combination, a channel running along the inner side of said joint, said channel being bounded on its outer sides by timed portions of the inner surface of the metal sheets which are adjacent the joined edges thereof and being bounded on its other sides by said wood backing, and a solder filler for said channel.

9. An invisible water-tight angle joint between beveled edges of two pieces of material each of which is made of a relatively thin outer sheet of metal which is so thin that its edges burn away when it is attempted to butt weld them bonded by suitable adhesive means to a relatively thick backing sheet of wood comprising, in combination, a channel running along the inner side of said joint, said channel being bounded on its outer sides by the portions of the inner surface of the metal sheets which are adjacent the joined edges thereof and being bounded on its other sides by said wood backing, and a steel rod filler for said channel which is welded to the metal sides thereof, said steel rod having a thermal storage capacity sufficiently high to prevent burning away of the adjacent edges of said thin metal sides and to prevent thermal destruction of said wood backing.

MacMILLAN CLEMENTS.